United States Patent
Berntsen et al.

(10) Patent No.: US 9,430,409 B2
(45) Date of Patent: Aug. 30, 2016

(54) MEMORY PROTECTION

(71) Applicant: NORDIC SEMICONDUCTOR ASA, Trondheim (NO)

(72) Inventors: Frank Berntsen, Heimdal (NO); Ola Marvik, Trondheim (NO)

(73) Assignee: NORDIC SEMICONDUCTOR ASA, Trondheim (NO)

( * ) Notice: Subject to any disclaimer, the term of this patent is extended or adjusted under 35 U.S.C. 154(b) by 350 days.

(21) Appl. No.: 13/924,249

(22) Filed: Jun. 21, 2013

(65) Prior Publication Data
US 2014/0006692 A1    Jan. 2, 2014

(30) Foreign Application Priority Data
Jun. 27, 2012  (GB) .................... 1211422.9

(51) Int. Cl.
G06F 12/14   (2006.01)
G06F 12/02   (2006.01)
G06F 21/79   (2013.01)
G06F 21/77   (2013.01)
G11C 16/22   (2006.01)

(52) U.S. Cl.
CPC ....... G06F 12/1433 (2013.01); G06F 12/0246 (2013.01); G06F 12/1441 (2013.01); G06F 21/77 (2013.01); G06F 21/79 (2013.01); G11C 16/22 (2013.01); G06F 12/1483 (2013.01)

(58) Field of Classification Search
CPC .......... G06F 12/1425; G06F 12/1433; G06F 12/1441; G06F 12/1483; G06F 12/1491
USPC ........................................ 711/103
See application file for complete search history.

(56) References Cited

U.S. PATENT DOCUMENTS 4,698,750 A * 10/1987 Wilkie ................ G06F 12/1433
                                                        365/185.04
4,931,993 A    6/1990 Urishima
5,001,670 A    3/1991 Slate et al.
(Continued)

FOREIGN PATENT DOCUMENTS

EP         0859319 A1    8/1998

OTHER PUBLICATIONS

ARM11 MPCore™ Processor Technical Reference Manual Revision: r2p0; ARM 2008.*
(Continued)

*Primary Examiner* — Reginald Bragdon
*Assistant Examiner* — Paul Knight
(74) *Attorney, Agent, or Firm* — Koppel, Patrick, Heybl & Philpott

(57) ABSTRACT

An integrated-circuit device (1) comprises a processor (7), memory (13) for storing executable code, and memory protection logic (9). The memory protection logic (9) is configured to: determine the state of a read protection flag for a protected region of the memory (13); detect a memory read request by the processor (7); determine whether the read request is for an address in the protected region of the memory (13); determine whether the processor (7) issued the read request while executing code stored in the protected region of the memory (13); and deny read requests for addresses in the protected region if the read protection flag for the protected region is set, unless at least one of one or more access conditions is met, wherein one of the access conditions is that the processor (7) issued the read requests while executing code stored in the protected region.

9 Claims, 4 Drawing Sheets

(56) References Cited

U.S. PATENT DOCUMENTS

| | | | |
|---|---|---|---|
| 5,737,760 A | 4/1998 | Grimmer et al. | |
| 6,883,075 B2 | 4/2005 | Lin et al. | |
| 6,895,508 B1 | 5/2005 | Swanberg et al. | |
| 6,952,778 B1 | 10/2005 | Snyder | |
| 7,054,990 B1* | 5/2006 | Tamura | G06F 12/1466 |
| | | | 711/103 |
| 7,210,014 B2 | 4/2007 | Drasnin et al. | |
| 7,343,496 B1 | 3/2008 | Hsiang et al. | |
| 7,516,902 B2 | 4/2009 | Modave | |
| 7,673,345 B2 | 3/2010 | Cheng et al. | |
| 7,917,716 B2 | 3/2011 | Berenbaum et al. | |
| 8,051,263 B2 | 11/2011 | Renno | |
| 2003/0023822 A1* | 1/2003 | Scott | G06F 12/1433 |
| | | | 711/163 |
| 2005/0198507 A1* | 9/2005 | Brender | G06F 21/51 |
| | | | 713/170 |
| 2005/0268058 A1 | 12/2005 | Drasnin et al. | |
| 2007/0250675 A1 | 10/2007 | Ono et al. | |
| 2008/0250228 A1 | 10/2008 | Elliott et al. | |
| 2009/0210644 A1 | 8/2009 | Batifoulier et al. | |
| 2009/0222596 A1* | 9/2009 | Flynn | G06F 3/061 |
| | | | 710/22 |
| 2009/0276595 A1* | 11/2009 | Abzarian | G06F 12/1441 |
| | | | 711/163 |
| 2011/0213915 A1* | 9/2011 | So | G06F 3/0619 |
| | | | 711/103 |

OTHER PUBLICATIONS

What are the Steps to Execute an Instruction? by Charles Lin; 2003.*

NAND Flash 101: An Introduction to NAND Flash; Micron 2006.*

LTE in a Nutshell: Protocol Architecture; White Paper; Telesystem Innovations; 2010.*

* cited by examiner

|  |  | Flags: deny debugger, protect Region 0 | | | |
| --- | --- | --- | --- | --- | --- |
|  |  | 1, 1 | 1, 0 | 0, 1 | 0, 0 |
| Request to access Region 0 | From debugger | X | X | X | ✓ |
|  | From Region 1 | X | ✓ | X | ✓ |
|  | From Region 0 | ✓ | ✓ | ✓ | ✓ |
| Request to access Region 1 | From debugger | X | X | ✓ | ✓ |
|  | From Region 1 | ✓ | ✓ | ✓ | ✓ |
|  | From Region 0 | ✓ | ✓ | ✓ | ✓ |

Figure 4

MEMORY PROTECTION

This invention relates to memory protection in an integrated-circuit device.

A microcontroller or system-on-chip device typically stores executable code in memory. It might have stored in its memory certain code (e.g. an operating system or firmware module) which is written by the chip manufacturer and other code (e.g. a software application) which is written by a customer or user. These will often be stored in non-volatile memory, such as EEPROM or flash.

It can be desirable to prevent the user code or an external debugging interface from being able to read or overwrite the code written by the chip manufacturer, while not restricting memory access for the chip manufacturer's code. This may be because the chip manufacturer's code contains trade secrets which it does not want any other party to be able to access. It may also help prevent the inadvertent corruption of the chip manufacturer's code by bugs in the user's code.

U.S. Pat. No. 8,051,263 describes a memory protection unit that selectively grants or denies requests for memory access according to a set of configurable memory protection attributes for a particular region of memory. Access to the region may depend on whether an execution unit is operating in a privileged or non-privileged mode of operation.

Such a mechanism could be used to protect a region of memory containing sensitive code from being read by user code, if the user code were executed in a non-privileged mode.

However, it may be possible for a malicious attacker to cause the processor to read the sensitive code from memory while in a privileged mode of operation, and then to output the contents to the attacker. Moreover, not all processors support privileged and non-privileged modes of execution.

The present invention therefore takes a different approach.

From a first aspect, the invention provides an integrated-circuit device comprising a processor, memory for storing executable code, and memory protection logic, wherein the memory protection logic is configured to:
  determine the state of a read protection flag for a protected region of the memory;
  detect a memory read request by the processor;
  determine whether the read request is for an address in the protected region of the memory;
  determine whether the processor issued the read request while executing code stored in the protected region of the memory; and
  deny read requests for addresses in the protected region if the read protection flag for the protected region is set, unless at least one of one or more access conditions is met, wherein one of said access conditions is that the processor issued the read requests while executing code stored in the protected region.

From a second aspect, the invention provides a method of controlling memory access on an integrated-circuit device comprising a processor and memory for storing executable code, the method comprising:
  determining the state of a read protection flag for a protected region of the memory;
  detecting a memory read request by the processor;
  determining whether the read request is for an address in the protected region of the memory;
  determining whether the processor issued the read request while executing code stored in the protected region of the memory; and
  denying read requests for addresses in the protected region if the read protection flag for the protected region is set, unless at least one of one or more access conditions is met, wherein one of said access conditions is that the processor issued the read requests while executing code stored in the protected region.

From a still further aspect, the invention provides a method of controlling memory access on an integrated-circuit device comprising a processor and memory for storing executable code, the method comprising:
  determining that a read protection flag for a protected region of the memory is set;
  detecting a memory read request by the processor;
  determining that the read request is for an address in the protected region of the memory;
  determining that the processor issued the read request while executing code stored in the protected region of the memory; and
  allowing the read request.

Thus it will be seen by those skilled in the art that, in accordance with the invention, the location of code being executed by the processor when it requests read access to a protected region of memory is used to determine whether to allow the request. Requests originating from code stored outside the protected region can be denied (if the read protection flag is appropriately set), while requests from code stored within the protected region itself are allowed. For many processor architectures, such as those from ARM®, it is important that code is able to issue data read requests to a region in which the code itself is stored, so that the processor can access constants embedded in the code.

The protection is enforced by the memory protection logic, which is preferably arranged to function independently of the processor. The memory protection logic preferably comprises hardware logic that is separate from the processor. It can thus be less susceptible to circumvention by malicious software code than protection which relies on privilege modes within the processor.

The chip manufacturer can conveniently store its code within the protected region and set the read protection flag in order to prevent a customer's code from reading the chip manufacturer's code, while preserving unrestricted memory access for its own code. Other sensitive information, such as configuration data, may also be stored in the protected region.

The memory protection logic is preferably configured to allow read requests for addresses in the protected region if the read protection flag for the protected region is not set. This may be useful during initial development stages of the device and its software. Similarly, the memory protection logic is preferably configured to allow write requests for addresses in the protected region if a write protection flag is not set.

The memory protection logic is preferably configured to deny read requests for addresses in the protected region if the read protection flag for the protected region is set, unless the processor issued the read requests while executing code stored in the protected region (in which case, they are allowed). Such preferred embodiments have only one aforesaid access condition. However, other embodiments may nevertheless provide for multiple access conditions, any of which can effectively override the read protection flag; for example, a device might conceivably allow reading of the protected region if the processor issued the read request while executing a manufacturer's boot-loader program stored in ROM.

The memory protection logic can further be configured similarly to determine the state of a write protection flag for the protected region and to deny write requests for addresses in the protected region if the write protection flag for the protected region is set, unless the processor issued the write requests while executing code stored in the protected region. The read protection flag may act as the write protection flag also, or these may be two separate flags.

In one set of preferred embodiments, this memory is non-volatile memory, such as flash. The processor may fetch code directly from the non-volatile memory for execution, or, in some embodiments, at least some of the code may be cached (e.g. in volatile memory). If the device comprises such a cache, it will be appreciated that references herein to executing code stored in the protected region encompass executing a cached copy of such code.

In other embodiments, the memory may be volatile memory, such as a portion of RAM reserved for executable code, and the protected region is a region of volatile memory. Executable code may be copied to such memory when the device powers on (e.g. from ROM or flash). Alternatively, sections of code or individual instructions may be copied to a protected region of volatile memory as needed, when the device is in use.

The processor and memory may be connected by one or more buses. The memory protection logic may also be connected to at least one of these buses. The memory protection logic is preferably configured to monitor all accesses to the memory (e.g. all read, write and instruction-fetch operations).

The memory protection logic may determine whether the processor issued the read request while executing code stored in the protected region of memory by determining whether the address of an instruction-fetch operation immediately preceding the memory access request was within the protected region. The memory protection logic may be configured to set a register on every instruction-fetch operation in accordance with whether the address of the fetched instruction is in the protected region or not. The register may comprise a binary flag which is set in accordance with whether the address of the instruction fetch is in the protected region or not.

The memory protection logic may be configured to use transaction-type information on a memory bus to identify an instruction-fetch operation (e.g. to distinguish it from a read request). Alternatively, it may be configured to identify an instruction-fetch operation by determining the state of a processor pin, or by determining the identity of bus conveying the fetch instruction (e.g. in devices having separate data-fetch and instruction-fetch buses). When using a Cortex-M0 processor from ARM®, the memory protection logic can use the HPROT[0] (Data/Opcode) signal from the Cortex-M0 to distinguish between an opcode fetch and data access.

The protected region may comprise a plurality of discrete areas or address ranges. However, it is preferably defined by a single, continuous address range, which can simplify the implementation logic. In some preferred embodiments, the protected region is variable and is defined by one or more addresses stored on the device, e.g. stored as configuration data in non-volatile memory.

The protected region may extend between a predetermined constant address and a variable point within the memory address range. The constant address may conveniently be a base or end address for the memory, or even for the whole memory address space for the device; e.g. zero (0x0000 0000). Thus the region can be specified compactly by a single value stored on the device, being the address defining the variable end of the protected region within the memory.

The memory protection unit can then be configured to determine whether the read request is for an address in the protected region of the memory by determining whether or not the address is between the predetermined constant address and the variable memory address. This operation can be implemented using relatively few logic gates.

In embodiments in which the aforementioned protected memory region is in non-volatile memory, the device may also comprise volatile memory, such as RAM. The memory protection logic may additionally be configured to deny read requests for addresses in a protected region of the volatile memory if a read protection flag for the protected region of the volatile memory is set, unless the processor issued the read requests while executing code stored in the protected region of the non-volatile memory. In this way, a region of protected RAM may be used by code stored in the protected region of the non-volatile memory (e.g. for heap storage) while being protected from read access by code stored outside the protected region. This can protect sensitive information that code written by the chip manufacturer may store in RAM.

Similarly, the memory protection logic may be configured to deny write requests for addresses in a protected region of the volatile memory if a write protection flag for the protected region of the volatile memory is set, unless the processor issued the write requests while executing code stored in the protected region of the non-volatile memory. In this way, customer code stored in non-volatile memory outside the protected region can be prevented from inadvertently or maliciously changing or overwriting volatile data belonging to code in the protected region of the non-volatile memory.

The non-volatile memory protection flags may act as the volatile memory protection flags also, or the volatile memory flags may comprise one or more separate flags.

In any of the foregoing embodiments, the device may comprise an interface (e.g. one or more pins) for allowing memory access by an external debugger or software loader. In preferred embodiments of the present invention, the memory protection logic is arranged to deny read requests received via such an interface for addresses in some or all protected regions of volatile or non-volatile memory if a debugging protection flag for the region is set. Protection may similarly be provided for write access to a protected region of volatile or non-volatile memory and/or for instruction fetches from a protected region. The memory protection logic may be configured to identify memory access requests as originating from a debugging interface by determining when a debugger is acting as a bus master for a memory bus in the device. When the processor is a Cortex-M0 from ARM®, the processor may use the HMASTER signal from the Cortex-M0 to distinguish between processor core and debugger transactions.

The memory protection logic may further be configured to determine the state of a read protection flag for a user region of memory for executable code. This user region may comprise part or all of the memory adjacent to, but excluding, the protected code region in the address space. The memory protection logic may by configured to deny read and/or write requests for addresses in the user region received from a debugging interface if the read protection flag for the user region is set. In this way, a customer or other user can protect his user application code from unauthorised access by a third-party; e.g. for reasons of confidentiality.

In some embodiments, the device comprises integrated radio communication logic, such as a radio transmitter and/or receiver (i.e. a radio-on-a-chip). A firmware module comprising code implementing a radio protocol stack may be stored in the protected region of code memory. A software application which interfaces with the firmware module may be stored outside the protected region.

Embodiments of the invention may be particularly suited to devices that do not have a traditional operating system, but which allow a user to develop native code for direct execution on the processor. This is because such devices cannot rely on an operating system to control memory access and to protect any confidential software libraries or modules which the device manufacturer may have installed in the device.

In any embodiments of the invention, the read and/or write protection flags are preferably stored in non-volatile memory. In use, the flags may of course be cached in a register or in RAM. A protection flag may just be one element in a larger set of configuration settings. It may be encoded in any suitable manner. In some embodiments each such protection flag is stored as a binary flag or bit field.

One or more of the protection flags may be stored in a protection-configuration region of non-volatile memory. Preferably the device comprises non-volatile memory control logic arranged to prevent writing to any portion of the protection-configuration region unless that portion is in an erased state. Preferably the non-volatile memory control logic is further arranged to allow the protection-configuration region to be erased only if a protected region of the non-volatile memory is in an erased state.

In this way, the protection flags cannot be rewritten without first erasing any data stored in the protected region of the non-volatile memory. Sensitive executable code stored in the protected region thus cannot be read simply by resetting the read protection flag for the non-volatile memory.

This idea is novel and inventive in its own right. Thus, from a further aspect, the invention provides an integrated-circuit device comprising a processor, non-volatile memory, non-volatile memory control logic, and memory protection logic, wherein:
  the memory protection logic is arranged to control access to a protectable region of the non-volatile memory in dependence on protection configuration data stored in a protection-configuration region of the non-volatile memory;
  the non-volatile memory control logic is arranged to prevent writing to any portion of the protection-configuration region unless that portion is in an erased state; and
  the non-volatile memory control logic is arranged to allow the protection-configuration region to be erased only if the protectable region is in an erased state.

From another aspect, the invention provides a method of controlling memory access on an integrated-circuit device comprising a processor and non-volatile memory, the method comprising:
  controlling access to a protectable region of the non-volatile memory in dependence on protection configuration data stored in a protection-configuration region of the non-volatile memory;
  preventing writing to any portion of the protection-configuration region unless that portion is in an erased state;
  allowing the protection-configuration region to be erased only when the protectable region is in an erased state.

Features of the earlier aspects and their embodiments may be optional features of embodiments of these aspects also, wherever appropriate. In particular, the protectable region may be a protected region of non-volatile memory as previously described, and the protection configuration data may comprise one or more protection flags as previously described.

Preferably the non-volatile memory control logic operates independently of the processor. It preferably comprises distinct logic gates, separate from the processor. In this way, a malicious or careless programmer cannot execute code on the processor that bypasses the non-volatile memory control logic. The memory protection logic is similarly independent of the processor in preferred embodiments.

U.S. Pat. No. 6,952,778 describes a microcontroller that provides read and/or write protection for memory blocks in an embedded memory according to a set of rules. These rules assign respective security levels to the memory blocks and are stored in a supervisory non-volatile memory. Once it has initially been programmed in accordance with an end user's requirements, the security level for a block can only be increased unless the supervisor non-volatile memory is erased and the microcontroller re-initialized. This results in the user-defined default security levels being restored.

However such an approach relies on the successful restoration of the default security levels in order for the memory blocks to be adequately protected. If an attacker were able to interfere with the process of re-initializing the microcontroller, the contents of the memory might be left unprotected and readable by the attacker.

Preferred embodiments of the present invention, by contrast, use dedicated non-volatile memory control logic and memory protection logic to ensure that the protection configuration data can only be reset if any sensitive information has first been erased from the device.

The non-volatile memory control logic may be configured so that the only mechanism provided by the non-volatile memory control logic for erasing the protection-configuration region is an instruction that erases both the protectable region and the protection-configuration region. This may be an instruction to erase all the non-volatile memory in the device.

If the protection-configuration region and the protectable region comprise different pages or erasable blocks of memory, the non-volatile memory control logic is preferably configured to erase all pages or blocks forming the protectable region before erasing any page or block forming part of the protection-configuration region. In this way, if the erase operation is interrupted before completing, the protection configuration data will still be present if the protectable region has not yet been fully erased, thereby continuing to provide protection.

The memory protection logic may be configured such that, when the protection-configuration region is in an erased state, access to the protectable region is in the highest of an ordered set of restriction levels. This can provide additional security by restricting access to the protectable region by default, e.g. in case a user omits to set new configuration data after an erase.

By allowing writing to the protection-configuration region when it is in an erased state, the protection configuration information can be set during manufacturing or commissioning, and during any subsequent reprogramming of the device.

The non-volatile memory control logic is preferably arranged to receive an instruction to write to a portion of the protection-configuration region and, in response, to check that the portion is in an erased state before allowing the write. It may do this by reading the portion and determining that it is in a natural erased state for the type of non-volatile memory. For example, flash memory contains a binary "1" in every bit after a page has been erased. The memory control logic may therefore check that every bit of the portion is a "1" before allowing the write operation. Other memory types may of course read "0" or have some other natural erased state.

Alternatively, regions of the non-volatile memory may contain erased state flags that are reset when the region is erased but are set by the non-volatile memory control logic when a first write operation is performed into that region. In this case, the non-volatile memory control logic may check one or more erased state flags before allowing a write operation to a portion of the protection-configuration region.

The memory-protection configuration region may store one or more values that define the protectable region of non-volatile memory and/or that define a protected region of volatile memory as previously described. In this way, an attacker cannot change the definition of the protected region (s) without first destroying its contents.

Optional or preferred features of one aspect or embodiment described herein may, wherever appropriate, be applied to any other aspect or embodiment.

Certain preferred embodiments of the invention will now be described, by way of example only, with reference to the accompanying drawings, in which:

FIG. 4 is a table showing decisions that the microcontroller may implement for protecting flash memory from unauthorized access.

Figure 1:
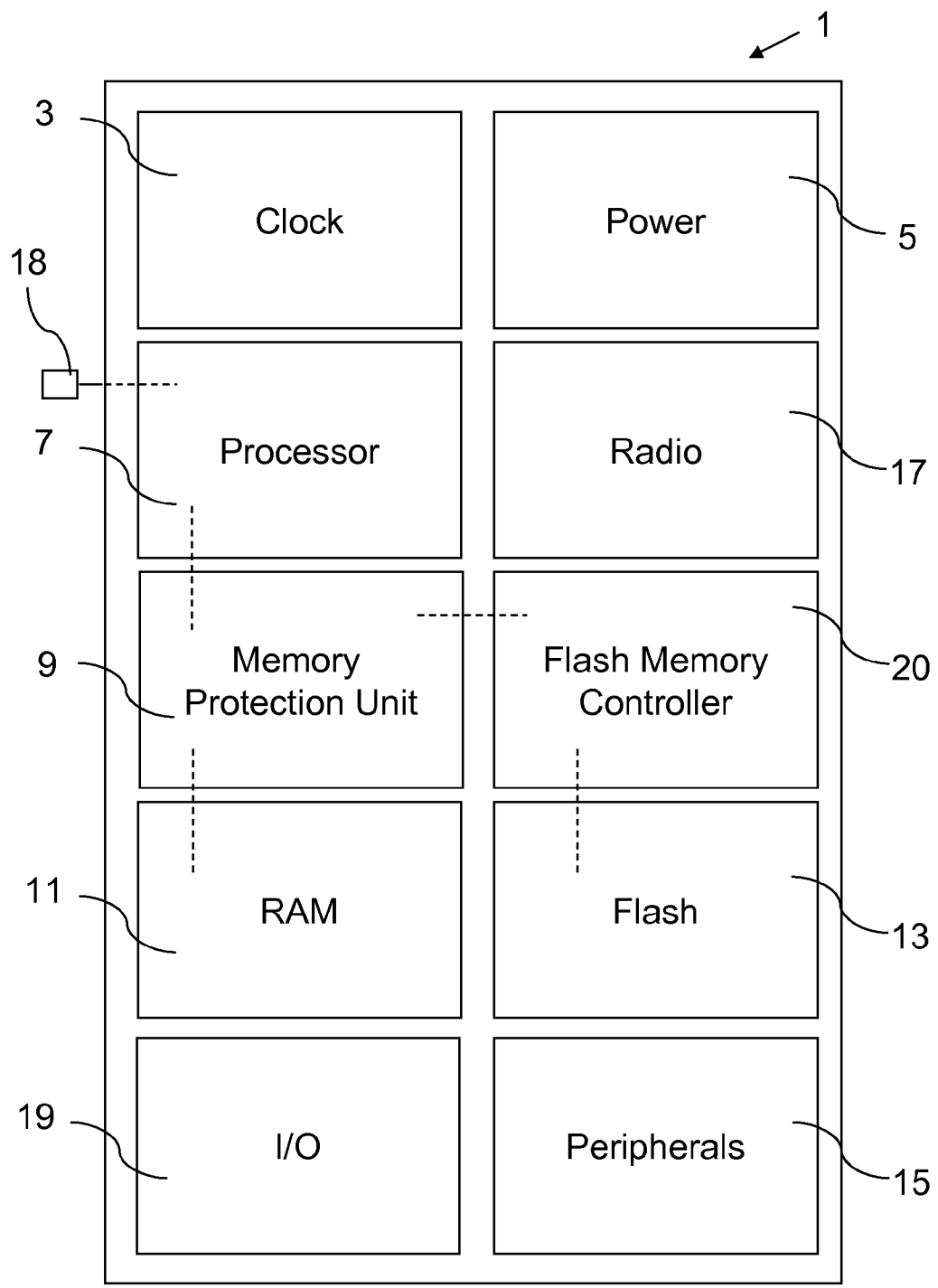
FIG. 1 is a schematic drawing of a microcontroller embodying the invention.

FIG. 1 shows an integrated-circuit microcontroller 1 or radio-on-a-chip which comprises clock logic 3, which may include a resistor-capacitor oscillator and/or may receive an input from an off-chip crystal oscillator (not shown), power management circuitry 5, a processor 7 (e.g. an ARM® Cortex-M0), a memory protection unit 9, RAM 11, a flash memory controller 20, flash memory 13, radio communication logic 17, one or more peripherals 15, and input/output circuitry 19. These components are interconnected using suitable lines and/or buses (not shown). The microcontroller 1 may use a Harvard architecture or a von Neumann architecture. The memory protection unit 9 is arranged to intercept all memory access instructions from the processor 7 to the RAM 11 and to the flash memory controller 20.

The microcontroller 1 also has a debugging interface 18 which may be used for loading data into the flash memory 13 and for debugging the processor 7. It does not have direct access to the RAM 11 and flash 13, but instead has to access these memories via the memory protection unit 9 and flash memory controller 20.

In use, the microcontroller 1 can be connected to a number of external components such as a power supply, radio antenna, crystal oscillator, sensors, output devices, etc.

Figure 2:
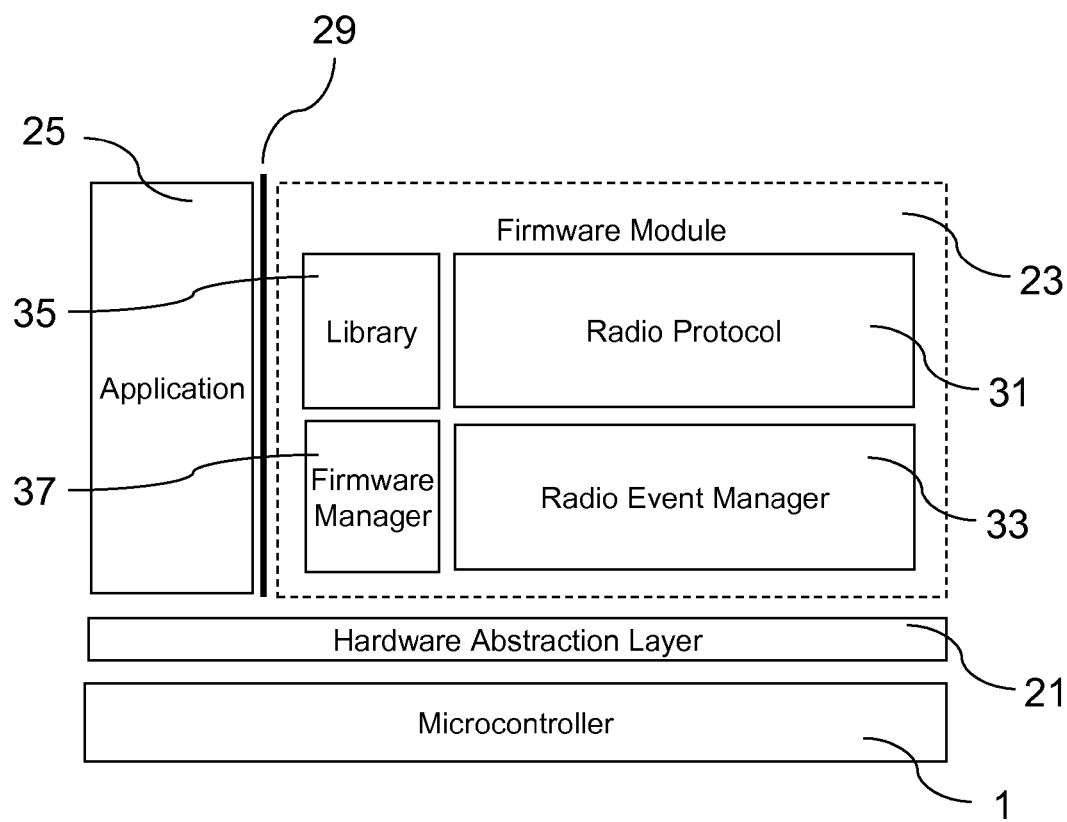
FIG. 2 is a schematic drawing showing major software components within the microcontroller architecture.

FIG. 2 shows software components that may be installed on the microcontroller 1. Interfacing with the microcontroller 1 hardware is an optional hardware abstraction layer 21, such as the ARM® Cortex Microcontroller Software Interface Standard. Above this sits a firmware module 23 and a separate software application 27.

The firmware module 23 is a binary application comprising a number of embedded software blocks. A radio protocol block 31 implements one or more wireless protocol stacks. A radio event manager 33 provides access scheduling for the radio communication logic 17 and event multiplexing. A library 35 provides shared hardware resource management and functions such as random number generation, configuring interrupts and priority, power management (e.g. for enabling and disabling peripherals), encryption functions, etc. A firmware manager 37 supports enabling and disabling the firmware module, and enabling and disabling the wireless protocol stack.

The firmware module 23 need not be a full operating system, in that it need not necessarily provide support for multi-threading, memory allocation, etc.

An application interface (API) 29 for the firmware module 23 allows the software application 27 to invoke functions in the firmware module 23. It may be implemented entirely using system calls. When using an ARM® processor, each API function prototype is mapped to a firmware function via an associated supervisor call (SVC) number at compile time. This mapping can be provided to the developer of the software application 27 to allow the functions to be called correctly.

The firmware module 23 can communicate events to the software application 27 as software interrupts, the content of which is buffered until read (polled) by the software application 27. The reading is done through an API call (e.g. event_get( ).

Figure 3:
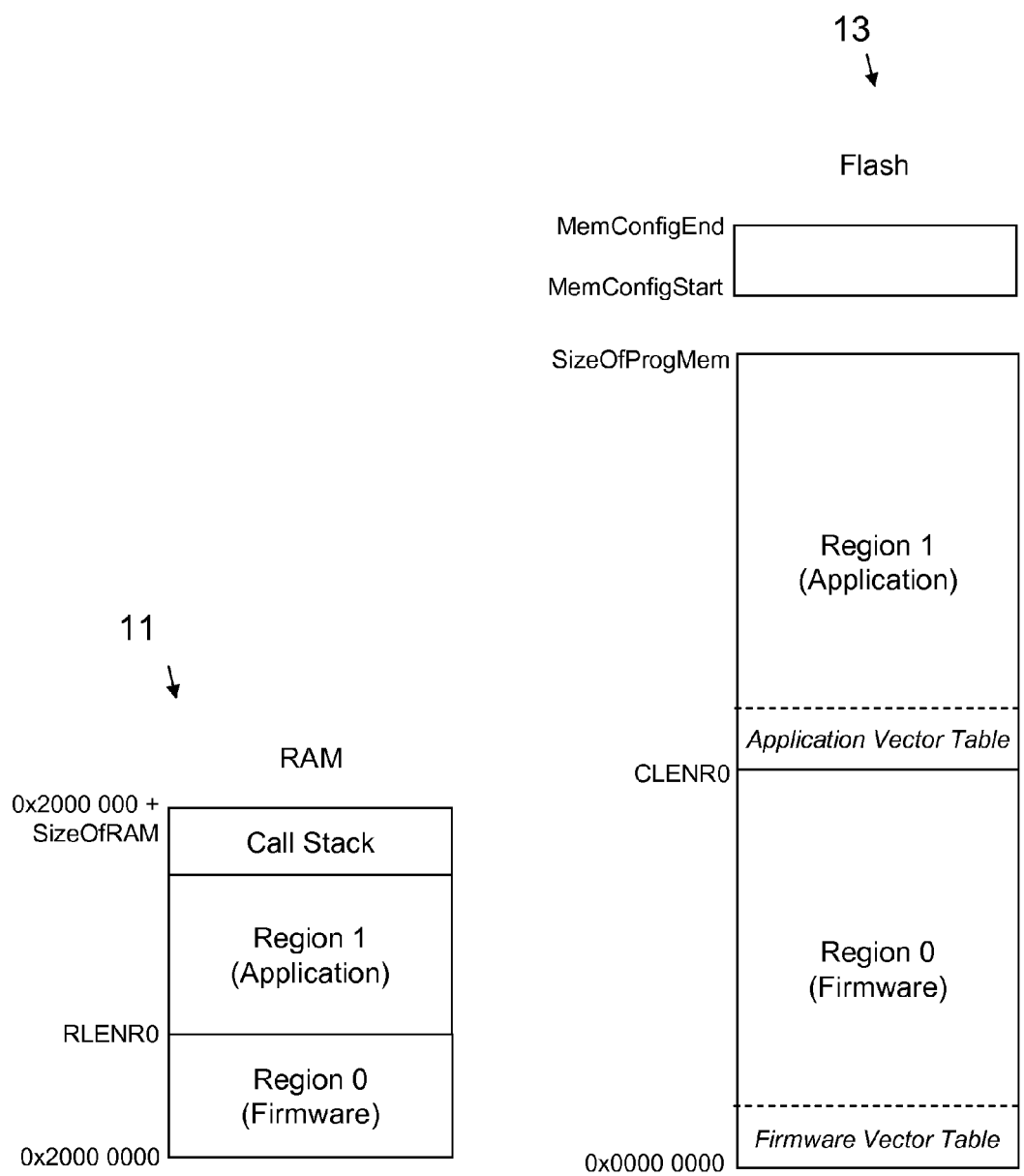
FIG. 3 is a schematic memory map for the microcontroller.

FIG. 3 shows how the RAM 11 and flash 13 are shared between the firmware module 23 and the software application 27. The flash 13 is assigned addresses from zero (0x0000 0000) to SizeOfProgMem for storing executable program code.

Another area of flash 13, which may be on its own flash page, extends from MemConfigStart to MemConfigEnd and is used for storing configuration data for use by the memory protection unit 9. In one set of embodiments, this page extends from 0x1000 0000 to 0x1000 07ff, but, as with all the address values mentioned herein, these values may depend on the particular processor architecture being used in any given embodiment.

The RAM 11 is assigned addresses from 0x2000 0000 upwards to 0x2000 0000+SizeOfRAM.

The program area of the flash 13 comprises two distinct regions either side of address CLENR0 (code length region 0). Region 0, between zero and CLENR0, is where the firmware module 23 is loaded. A firmware interrupt vector table is stored at address zero. Region 1, extending upwards from CLENR0 to SizeOfProgMem, is where the software application 27 is loaded. It too can have an interrupt vector table, at address CLENR0.

The RAM 11 similarly has a Region 0, from the base address 0x2000 000 to RLENR0, and a Region 1, extended upwards from RLENR0. RAM Region 0 provides heap storage for the firmware module 23 while RAM Region 1 provides heap storage for the software application 27. A call stack is shared between the firmware module 23 and the software application 27 and grows downwards from (0x2000 0000+SizeOfRAM). The memory allocated to the call stack must be big enough for the needs of both the software application 27 and the firmware module 23.

The values of CLENR0 and RLENR0 are stored in the memory-protection configuration area of the flash memory 13.

On power up, relevant data stored in the memory protection configuration area of flash 13 is copied to memory protection configuration registers accessible to the memory protection logic 9. These registers are writeable only from a hardware state machine that executes only during power on of the microcontroller 1, such that the only way of changing the contents of these registers is to change the data in the memory protection configuration area of the flash 13.

The memory protection logic 9 is arranged to intercept all memory access requests (e.g. data fetch or instruction fetch operations) from the processor 7 to the flash memory 13 and the RAM 11. It can identify an instruction-fetch operation from a "transaction type" on the memory bus. For every instruction fetch that the processor 7 makes from the flash memory 13, the memory protection logic 9 updates a single-bit flag in a "firmware region" register with a "1" if the address of the fetched instruction is less than CLENR0 and with a "0" if the address is greater than or equal to CLENR0.

For every data access request, the memory protection logic 9 determines whether the source of the access request was from the firmware module 23 or elsewhere by checking the value of the "firmware region" register. It can be configured to detect if the source of the request is the debugger interface 18, or a direct-memory access (DMA) unit, by determining the identity of the active memory bus master. It also accesses the memory protection configuration registers to determine whether to allow or deny the access request based on the state of the "firmware region" register and the identity of the bus master.

In some preferred embodiments, the software application 27 is denied read and write access to flash Region 0 and to RAM Region 0. This protects confidentiality for the firmware module 23 and can prevent inadvertent or malicious writing by the software application 27 to memory locations allocated to the firmware module 23, thereby increasing robustness and security. The software application flash Region 1 may also be protected from read access, e.g. to protect against read back via the external debugging interface 18.

FIG. 4 shows a decision table that the microcontroller 1 might implement for protecting the flash memory 13 from unauthorised access. Alternative implementations are, of course, possible.

Two binary flags are stored in the memory-protection configuration region of the flash memory 13 (and are copied to registers on boot up). The first, when set, prevents data read and write access to all of the program flash via the debugging interface 18. The second, when set, prevents data read and write access to the Region 0 flash memory by anything other than code executing from Region 0 itself. Execution access (i.e. instruction fetches) by the processor 7 is still allowed, even when data read access is denied.

If an attacker were able to change the data stored in the memory-protection configuration area of the flash memory 13, the protection mechanisms could be bypassed. However, the flash memory controller 20 prevents writing to the memory-protection configuration area unless it is in an erased state. Furthermore, the flash memory controller 20 prevents erasing of the memory-protection configuration area unless Regions 0 & 1 of the flash memory 13 have been erased first. It uses digital logic implementing a finite state machine to enforce these conditions.

If the flash memory controller 20 receives an instruction to write a word to an address in the memory-protection configuration area, it will first read the existing contents at that address and will only allow the write if the existing contents are all binary "1"s, indicating that this address has not been written to since an erase of the memory-protection configuration area flash memory. If the check fails, it will deny the write and may raise an exception with the processor 7.

If the flash memory controller 20 receives an instruction to erase the entire flash memory 13, it will respond by erasing the contents of flash Regions 0 and 1 first, before erasing the memory-protection configuration area. For this reasons, the memory-protection configuration area is preferably stored in its own erasable flash page, separate from any program areas of the flash memory 13.

The flash memory controller 20 will deny any instruction to erase just the memory-protection configuration area.

The skilled person will appreciate microcontroller 1 may also be configured to prevent code executing other than in Region 0 of the flash memory 13 from accessing important features, such as registers related to low-level functions of the radio communication logic 17, the power control logic 5, a direct-memory access (DMA) controller, or interrupt registers.

The invention claimed is:

1. An integrated-circuit device comprising a processor, non-volatile memory, non-volatile memory control logic, and memory protection logic, wherein:
   the memory protection logic is arranged to control access to a protectable region of the non-volatile memory in dependence on protection configuration data stored in a protection-configuration region of the non-volatile memory;
   the non-volatile memory comprises regions containing erased-state flags and the device is configured to reset a respective erased-state flag when each region is erased;
   the non-volatile memory control logic is arranged to set a respective erased-state flag when a first write operation is performed into each region;
   the non-volatile memory control logic is arranged to prevent writing to any portion of the protection-configuration region unless that portion is in an erased state by checking one or more erased state flags before allowing a write operation to a portion of the protection-configuration region; and
   the non-volatile memory control logic is arranged to allow the protection-configuration region to be erased only if the protectable region is in an erased state.

2. The integrated-circuit device of claim 1, wherein the non-volatile memory control logic and/or memory protection logic comprise logic gates separate from the processor.

3. The integrated-circuit device of claim 1, wherein the non-volatile memory control logic is configured so that the only mechanism provided by the non-volatile memory control logic for erasing the protection-configuration region is an instruction that erases both the protectable region and the protection-configuration region.

4. The integrated-circuit device of claim 1, wherein the protection-configuration region and the protectable region comprise different pages or erasable blocks of memory, and the non-volatile memory control logic is configured to erase all pages or blocks forming the protectable region before erasing any page or block forming part of the protection-configuration region.

5. The integrated-circuit device of claim 1, wherein the memory protection logic is configured such that, when the protection-configuration region is in an erased state, access to the protectable region is in the highest of an ordered set of restriction levels.

6. The integrated-circuit device of claim 1, wherein the non-volatile memory control logic is arranged to receive an instruction to write to a portion of the protection-configuration region and, in response, to check that the portion is in an erased state before allowing the write.

7. The integrated-circuit device of claim 6, wherein the non-volatile memory is of a type that has a natural erased state, and wherein the non-volatile memory control logic is arranged check that the portion is in an erased state by reading the portion and determining whether it is in the natural erased state.

8. The integrated-circuit device of claim 1, arranged to store, in the memory-protection configuration region, one or more values that define the protectable region of non-volatile memory and/or that define a protected region of volatile memory.

9. The integrated-circuit device of claim 1, wherein the protection configuration data comprises a read protection flag for the protectable region of the non-volatile memory, and wherein the memory protection logic is configured to:
  determine the state of the read protection flag;
  detect a memory read request by the processor;
  determine whether the read request is for an address in the protectable region;
  determine whether the processor issued the read request while executing code stored in the protectable region; and
  deny read requests for addresses in the protectable region if the read protection flag for the protectable region is set, unless at least one of one or more access conditions is met, wherein one of said access conditions is that the processor issued the read requests while executing code stored in the protectable region.

* * * * *